Patented June 4, 1940

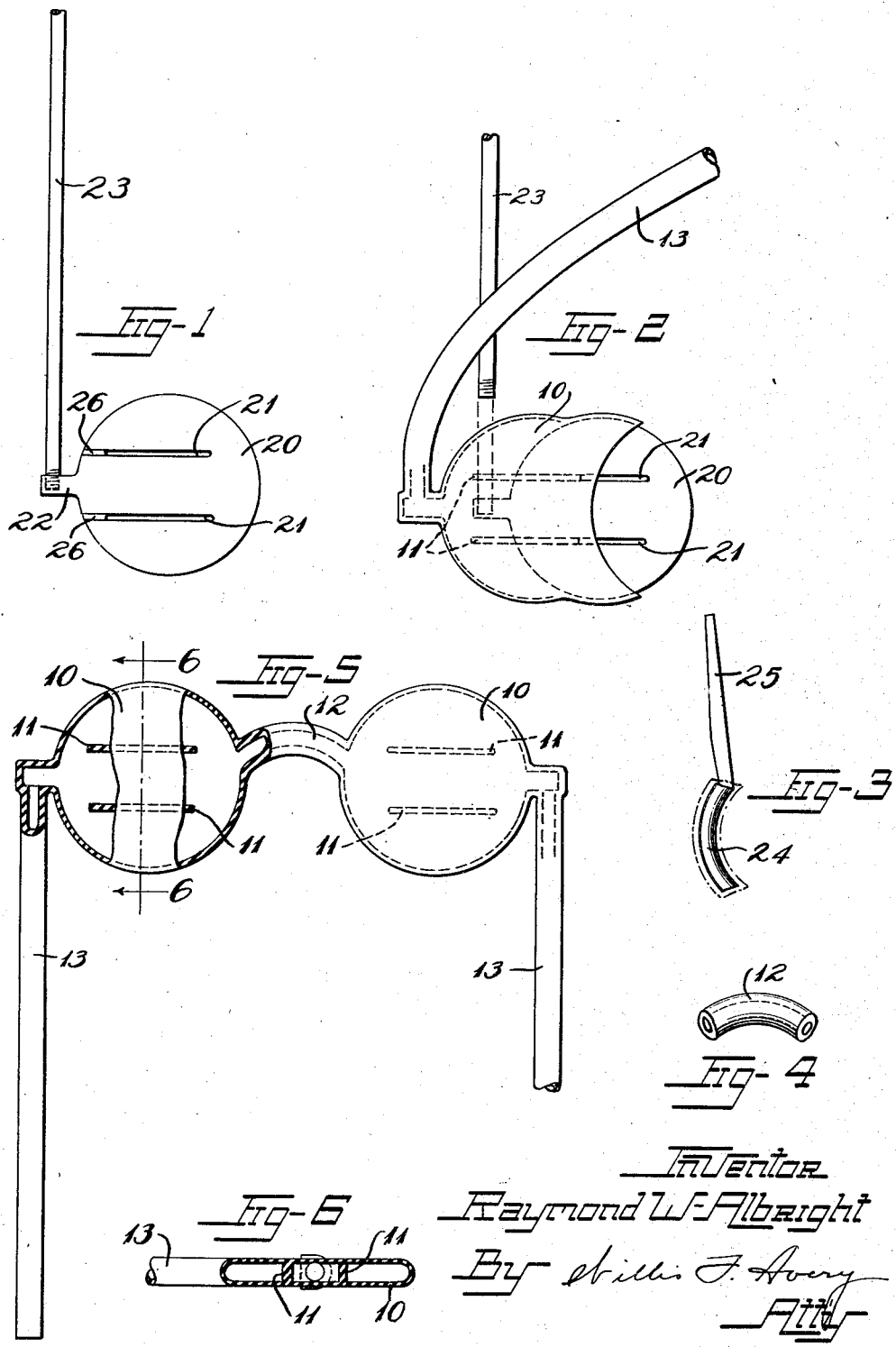

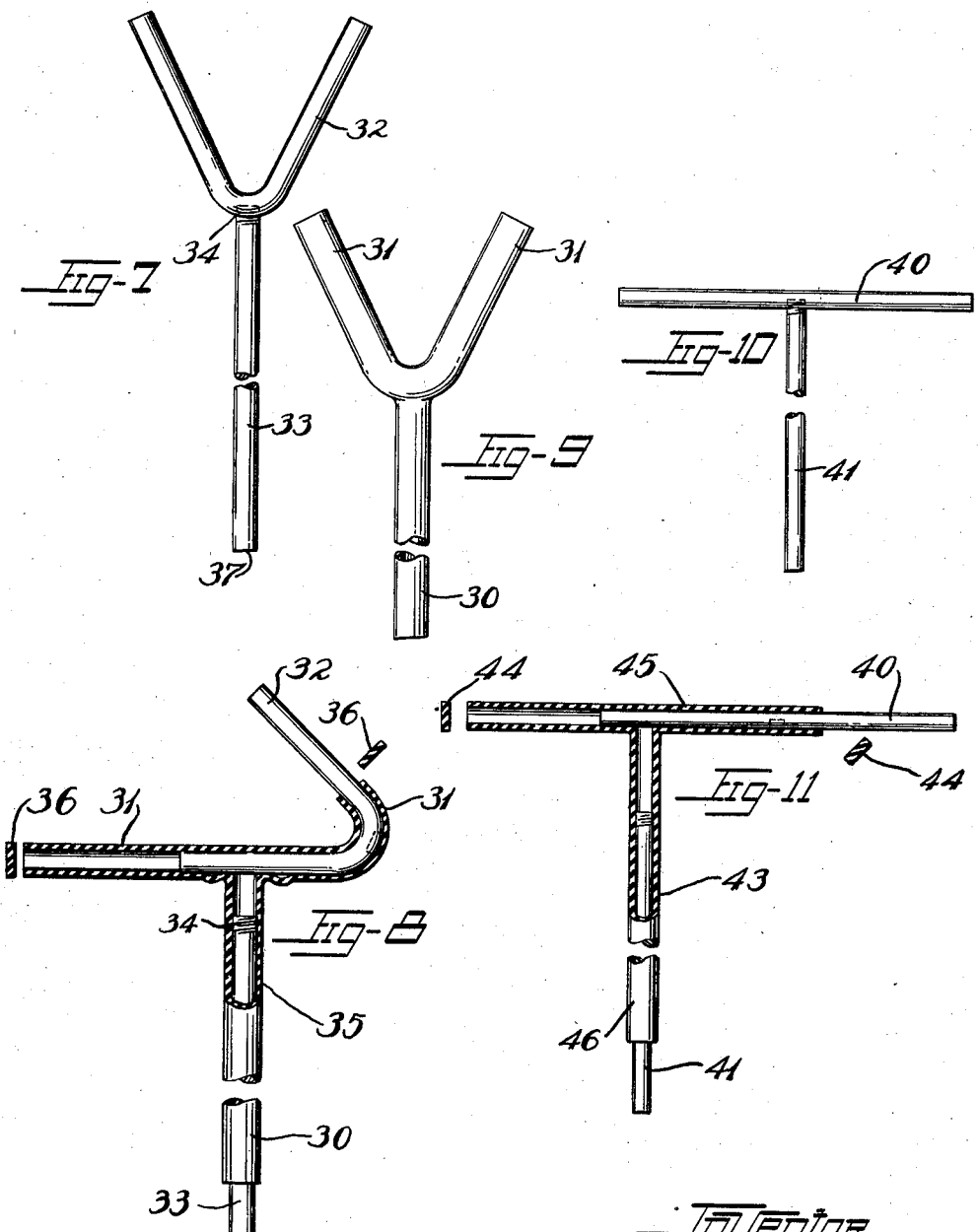

2,203,072

UNITED STATES PATENT OFFICE 2,203,072

METHOD OF MAKING RUBBER ARTICLES

Raymond W. Albright, Akron, Ohio, assignor to American Anode, Inc., Akron, Ohio, a corporation of Delaware Original application March 31, 1934, Serial No. 718,402. Divided and this application January 15, 1938, Serial No. 185,188

4 Claims. (Cl. 18—58)

This invention relates to the manufacture of rubber articles and has for its chief objects the provision of simple, economical and efficient procedure for manufacturing rubber articles having complicated hollow structures such as are frequently encountered in special medical and surgical accessories and appliances and which render manufacture of the articles by ordinary rubber manufacturing methods extremely difficult and unsatisfactory, if not impossible. Although the present invention is by no means limited to the manufacture of medical and surgical appliances, it is especially adapted for use in making such articles and will be described in connection with the manufacture of several illustrated medical and surgical appliances presenting difficult manufacturing problems which have been effectively solved by the present invention.

The invention will be described with reference to the accompanying drawings in which Figs. 1 to 6 illustrate the manufacture of a therapeutical appliance especially designed for use in applying heat or cold to the eyes and adjacent facial areas of a patient, Figs. 7 to 9 illustrate the manufacture of a branched surgical drain in the form of a Y, and Figs. 10 and 11 illustrate the manufacture of a similar surgical drain in the form of a T.

Of the drawings:

Fig. 1 is an elevation showing an assembled two-part form used in making a portion of the eye-treating device;

Fig. 2 is an elevation showing the form of Fig. 1 in a disassembled condition with a rubber deposit constituting a portion of the eye-treating device being removed from the forms;

Fig. 3 is an elevation showing a form used in making another portion of the eye-treating device;

Fig. 4 is an elevation showing the portion of the eye-treating device which is made on the form of Fig. 3, after it has been trimmed and prepared for assembling with other constituent portions of the device;

Fig. 5 is an elevation, partially broken away and sectioned for clarity of illustration, showing the finished eye-treating device;

Fig. 6 is a vertical section taken on line 6—6 of Fig. 5;

Fig. 7 is an elevation showing an assembled two-part form used in making a Y drain;

Fig. 8 is an elevation, partially sectioned and broken away for clarity of illustration, showing the form of Fig. 7 in a disassembled state with an enveloping rubber deposit being removed from the form;

Fig. 9 is an elevation showing a finished Y drain made according to the present invention;

Fig. 10 is an elevation showing an assembled two-part form used in making a T drain; and Fig. 11 is an elevation, partially sectioned and broken away for clarity of illustration showing the form of Fig. 10 in a disassembled state with an enveloping rubber deposit constituting the T drain being removed from the form.

In my copending application, Serial No. 718,402, filed March 31, 1934, of which this application is a division, I have described and claimed a device designed for treating the eyes and adjacent facial areas with heat or cold.

The eye-treating device in a preferred form illustrated in Fig. 5 comprises two hollow, thin walled rubber applicators 10, 10 which are substantially flat and generally circular in shape and are of such size that they may be fitted conveniently over a patient's eyes to cover completely the eyes and immediately adjacent facial areas. Thin integral webs of rubber 11, 11 extend from one flat side of the applicator to the other for a substantial distance, preferably in a direction parallel to a line joining the inlet and outlet fluid conduits to be described hereafter. Communicating with the interiors of the two applicators at points upon their peripheries and integrally joined to the walls thereof is provided a rubber tube 12 having walls relatively heavier and accordingly less distensible than the thinner walls of the applicators. The tube 12 preferably is curved and of such length as is necessary conveniently and comfortably to bridge a patient's nose when the applicators are in position over his eyes. Connecting fluid conduits, preferably integral rubber tubes 13, 13 communicate with the interiors of the hollow applicators at points preferably generally opposite the point of communication of the aforesaid tube 12. The tubes 13, 13 preferably are made with a right angle turn in the plane of the applicators near the point of joinder with the applicators, and should be sufficiently long to extend from under a binding holding the applicators in position, to be connected to fluid circulating apparatus. The walls of the tubes 13, 13, like those of the tube 12, preferably are heavier and less distensible than the walls of the applicators. Thus, it will be seen that the appliance, which in some respects resemble a pair of spectacles, may be placed in position over the eyes of a patient and bound in place in any convenient manner, and that water or other fluid at a desired temperature may be circulated continuously through the appliance to subject the contiguous bodily tissues to a controlled uniform temperature, without undue discomfort to the patient. The water may be forced through the appliance under pressure sufficient to distend the thin walled applicators slightly and thereby to insure even contact of the applicator with the irregular areas over and about the eyes. Distension of the applicator is limited however by the webs of rubber 11, 11 joining the two flat sides of the applicators which serve to prevent extreme distension of the applicator which might cause excessive pressure to be exerted upon the eyes, particularly when the appliance is bound tightly in place. In addition, the webs aid in directing flow of the water to outer circumferential portions of the applicator. It is to be understood that the webs within the applicators, although highly desirable, are not essential and that an applicator without such webs may be used quite satisfactorily in the application of hot or cold treatments.

The complicated structure of the eye-treating device has necessitated the provision of special procedure for its manufacture, which is accomplished by depositing rubber from a liquid rubber dispersion upon suitable forms. Two forms are required. The first form illustrated in Fig. 1 is designed to form one applicator and integral connecting tube, and comprises a generally flat and circular applicator-forming portion 20, preferably having two parallel narrow slots 21, 21 extending from the periphery of the form inward for a distance corresponding to the length of webs required in the finished applicator. A tubular projection 22 having a diameter corresponding to the desired inner diameter of the connecting tube, is provided upon the periphery of the form, preferably between the open ends of the two slots 21, 21 and a rod 23 designed to form the connecting tube proper is screwed into the tubular projection 22 preferably at right angles to the axis thereof and in the plane of the applicator-forming portion 20. The second required form shown in Fig. 3 is designed to form the short tube which connects the two applicators and bridges the nose of a patient, and comprises a curved tubular portion 24 shaped to form the tube, one end of the form being extended to provide a handle 25 for convenience in dipping.

In proceeding with the manufacture of the eye-treating device, small pieces of pearl glue 26, 26, or other water-soluble coherent solid or equivalent disintegrable material, are wedged in the open ends of the slots 21, 21 of the form 20, and the entire form is immersed in a liquid dispersion of rubber preferably a compounded latex, until a relatively thin layer of rubber about 0.01 inch thick is deposited upon the form in any usual manner. The form then is removed from the dispersion and the tube-forming portion 23 preferably is re-dipped until the rubber coating thereupon is considerably heavier than that upon the rest of the form, for example about 0.04 inch thick. The entire rubber coating then is washed thoroughly, during which the glue in the slots is dissolved and completely removed. The washed coating then is dried and partially vulcanized to a degree which will permit of considerable stretching without permanently deforming the rubber, but which is not sufficiently far advanced to prevent securing the best possible adhesion between the rubber and other parts of the applicator later to be adhered thereto. To remove the form from the interior of the rubber, the rod 23 is unscrewed and pulled out the end of the rubber tube 13 formed thereon, and the applicator portion 10 of the rubber is slit for a short distance along the periphery thereof at a point generally opposite to the point of communication of the connecting tube with the applicator portion, and the applicator-forming portion 20 of the form is removed through the slit, the rubber being stretched to permit its removal as indicated in Fig. 2. The procedure thus far described then is repeated to make a second applicator and integral connecting tube identical in structure with the first. The second form 24 then is provided with a relatively heavy coating of rubber of approximately the same thickness as that of the connecting tubes 13, and the rubber is washed, dried, and partially vulcanized as in making the applicators. The rubber then is stripped from the form and is trimmed to provide a nose-bridging tube 12 as illustrated in Fig. 4.

To assemble the various parts of the appliance, the ends of the short nose-bridging tube 12 and the portions of the two applicators immediately surrounding the two slits hereinabove mentioned, are coated with a rubber adhesive such as a rubber cement, or latex, and the ends of the tube are inserted into the slits and are pressed into adhesive engagement with the walls of the applicators. When the adhesive has dried, the entire assembled appliance preferably is immersed in a liquid dispersion of rubber to acquire a thin overall enveloping coating of rubber, which is dried. Thereafter vulcanization of the as yet only partially vulcanized rubber of the assembled appliance, is completed in any convenient manner to provide the finished eye-treating device illustrated in Fig. 5.

A preferred Y surgical drain as illustrated in Fig. 9 consists of a branched tubular structure including a tubular stem 30 and spreading tubular arms 31, 31, all of one-piece integral structure impossible to manufacture satisfactorily by methods in use prior to the present invention.

To manufacture such a Y drain, I utilize a deposition form comprising two separate members detachably assembled to provide the complete deposition form. Thus, the preferred Y form illustrated in Fig. 7 comprises a V shaped member 32 designed to form the spreading arms of the Y, and a straight rod member 33 designed to form the tubular stem of the Y, the end of the straight rod member 33 being detachably secured to the V member at the apex thereof in any suitable manner as by means of the threaded connection shown at 34. The form members conveniently may be made from aluminum rod of suitable size.

The assembled Y form is then provided with an enveloping coating of rubber 35 in any convenient manner, but preferably by preliminarily applying to the form a coating containing a pulverulent material and a coagulant and then immersing the form in liquid rubber latex as described in U. S. Patent No. 1,924,214, the form preferably being supported by the end 37 of the straight form member 33 with the branched portion of the form extending downward during the immersion in the latex. Next the deposited rubber coating is dried and vulcanized according to the customary well known procedures requiring no detailed explanation.

To complete the Y drain, the portions of the rubber deposit overlying the ends of the branches of the Y are cut off, as indicated by the removed portions of rubber 36, 36, the deposition form is disassembled by detaching the rod member 33 from the V member 32, the rod member 33 is removed through opening in the end of the tubular stem 30, and the V member is removed through the end opening in either of the spreading branches of the Y, the rubber tube flexing to permit such removal, all as illustrated in Fig. 8.

A T drain of one-piece integral structure may be readily produced in a similar manner by utilizing a two-part form, as illustrated in Fig. 10, comprising a cross-member 40 and a stem member 41 threaded into, or otherwise detachably secured to, the cross member at its midpoint. The assembled form is coated with rubber 43 as described in connection with the manufacture of the Y drain, and the rubber is vulcanized. Then the rubber 44, 44 overlying the ends of the member is cut away, the form is disassembled, and the form members are separately removed from the arms of the T drain, the cross-member 40 being removed through the opening in either end of the cross head 45 of the T while the stem member 41 is removed through the opening in the end of the tubular stem 46 of the T.

Y and T drains made according to this invention embody a one-piece integral tubular structure especially desirable in surgical accessories and which has not been duplicated by any other method.

It is thus seen that I have provided a novel, yet simple and efficient method of making complicated rubber articles such as the surgical and medical appliances illustrated which have not been made with equal satisfaction by methods heretofore in use in the rubber industry.

The term "liquid dispersion of rubber" or "liquid rubber composition" have been used in the specification and appended claims in a broad sense to include all flowable dispersions of rubber and like natural or synthetic gums or resins, whether the rubber be artificially dispersed in water, or in an organic solvent, as well as natural latices of rubber producing plants. The dispersions may be concentrated, diluted, thickened, thinned, vulcanized or otherwise treated as may be desired, and may contain any necessary compounding ingredients such as are commonly used in the manufacture of rubber goods.

Numerous modifications may be made in details of the invention as hereinabove described without departing from the scope of the discovery as defined in the appended claims.

I claim:

1. The method of making a medical appliance comprising a hollow applicator provided with connecting tubes for circulating fluid through the applicator, which comprises providing a generally flat and circular applicator-forming member, providing a separate tube-forming member, detachably securing the tube-forming member to the applicator-forming member to provide an assembled form of the required shape, coating the form with a liquid rubber composition, solidifying the coating on the form to provide a hollow rubber applicator and integral connecting tube, slitting the applicator along the periphery thereof, dis-assembling the form, removing the tube-forming member through the end of the tube formed thereon, removing the applicator-forming member through the slit, inserting a rubber tube in the slit and adhering the tube to the walls of the applicator to provide a fluid-tight seal at the junction.

2. A method as defined by claim 1 in which the liquid rubber composition comprises natural rubber latex.

3. A method as defined by claim 1 which comprises the additional steps of partially vulcanizing the rubber coating before removing the applicator-forming member of the form and then completing vulcanization of the rubber after the appliance is assembled.

4. A method as defined by claim 1 which comprises the additional steps of applying a thin coating of a liquid rubber composition over the assembled appliance and then drying the thin coating.

RAYMOND W. ALBRIGHT.